United States Patent [19]

Blankenship

[11] Patent Number: 4,929,811

[45] Date of Patent: May 29, 1990

[54] PLASMA ARC TORCH INTERLOCK WITH DISABLING CONTROL ARRANGEMENT SYSTEM

[75] Inventor: George D. Blankenship, Chardon, Ohio

[73] Assignee: The Lincoln Electric Company, Cleveland, Ohio

[21] Appl. No.: 280,240

[22] Filed: Dec. 5, 1988

[51] Int. Cl.[5] .......... B23K 9/00

[52] U.S. Cl. .......... 219/121.54; 219/121.57; 219/130.4; 219/130.32

[58] Field of Search .......... 219/121.54, 121.52, 219/121.57, 121.59, 124.01, 130.32, 130.4

[56] References Cited

U.S. PATENT DOCUMENTS

| | | | |
|---|---|---|---|
| 3,745,321 | 7/1973 | Shapiro et al. | 219/121 |
| 4,049,946 | 9/1977 | Fluckiger et al. | 219/130.32 |
| 4,272,671 | 6/1981 | Hukagawa et al. | 219/212 |
| 4,330,700 | 5/1982 | Jagieniak et al. | 219/121.54 |
| 4,585,921 | 4/1986 | Wilking et al. | 219/121 |
| 4,590,354 | 5/1986 | Marhic et al. | 219/121 |
| 4,663,515 | 5/1987 | Kneeland et al. | 219/121 |
| 4,682,005 | 7/1987 | Marhic | 219/121 |
| 4,814,577 | 3/1989 | Dallavalle et al. | 219/121.54 |

FOREIGN PATENT DOCUMENTS

| | | | |
|---|---|---|---|
| 0219475 | 9/1986 | Japan | 219/121.54 |

*Primary Examiner*—M. H. Paschall

*Attorney, Agent, or Firm*—Body, Vickers & Daniels

[57] ABSTRACT

A plasma arc torch system includes a fault detect circuit for sensing a short between the electrode and the nozzle and disabling the power supply when the short is sensed. A sensing circuit within the torch cable is provided for actuating the fault detect circuit when the cable is severely punctured. The sensing circuit includes a foil embedded within the cable which circumscribes the main conductor to which a drain lead is connected. The drain lead senses a short between the foil and main conductor from a penetrating foreign object and actuates the fault detect circuit. Additionally, the fault detect circuit is effective in combination with a unique continuity interlock circuit disclosed to insure a\safe torch. Further, a rectified control circuit is provided to maintain a stable arc preventing erosion of the nozzle and subsequent exposure of the electrode.

48 Claims, 6 Drawing Sheets

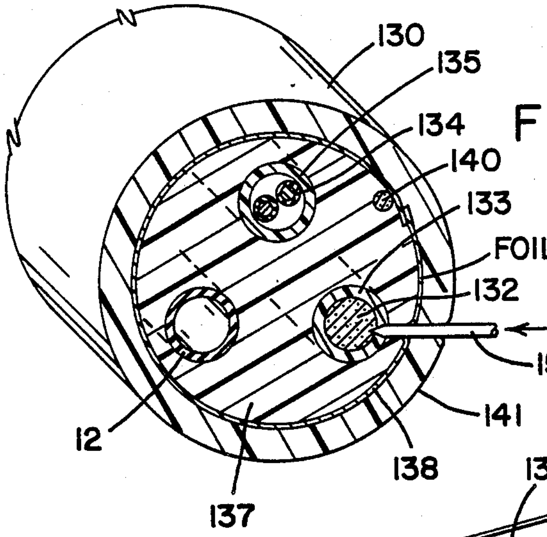
FIG. 6
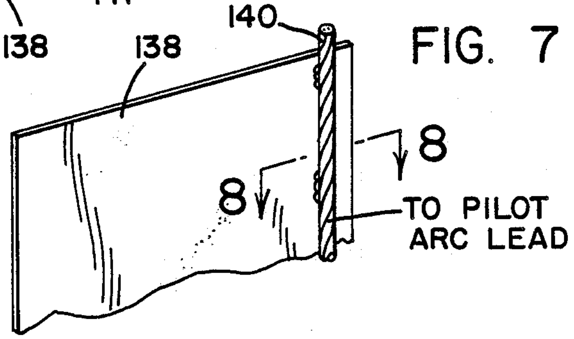
FIG. 7
FIG. 8
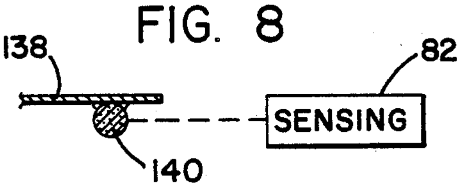
FIG. 9
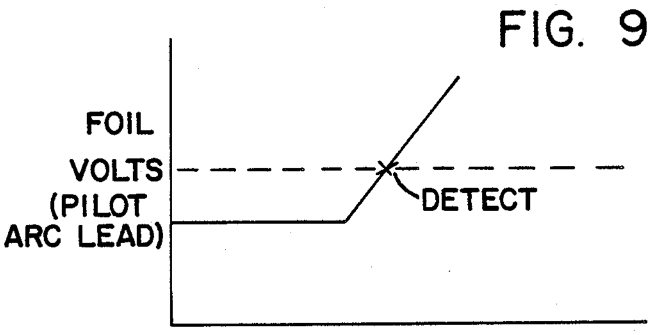

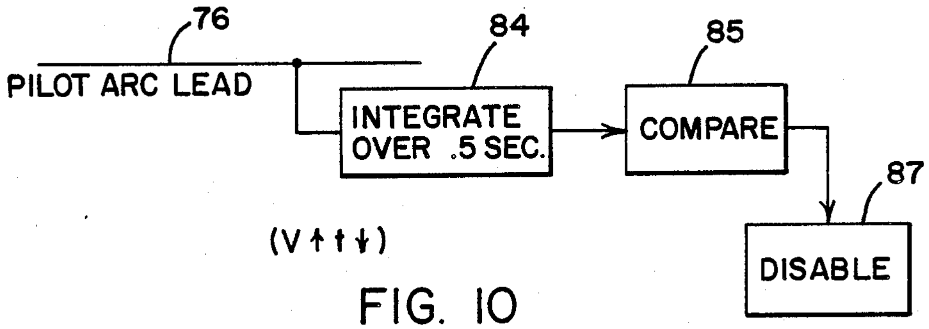
FIG. 10
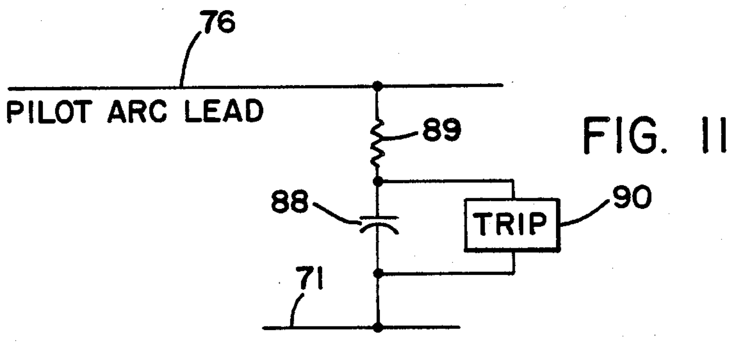
FIG. 11
FIG. 12
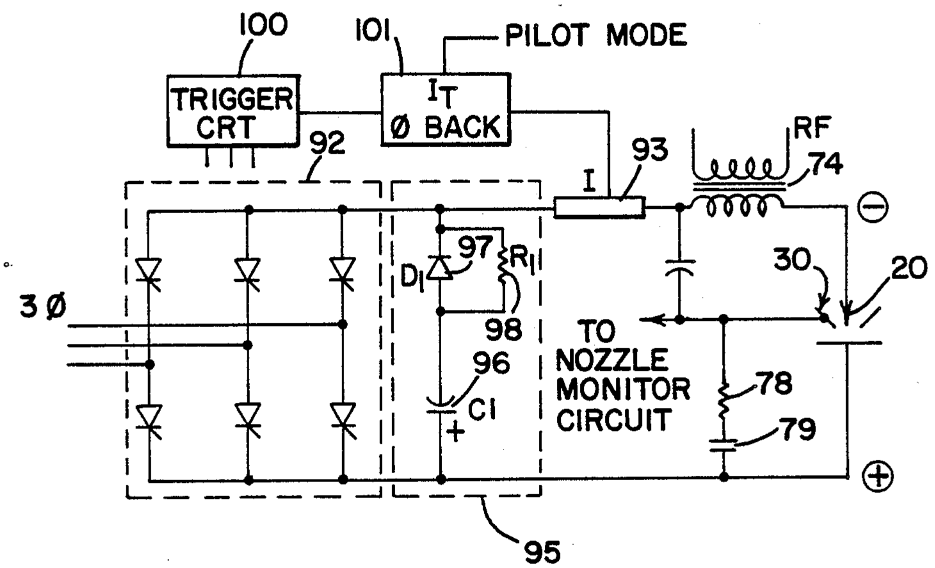

FIG. 13
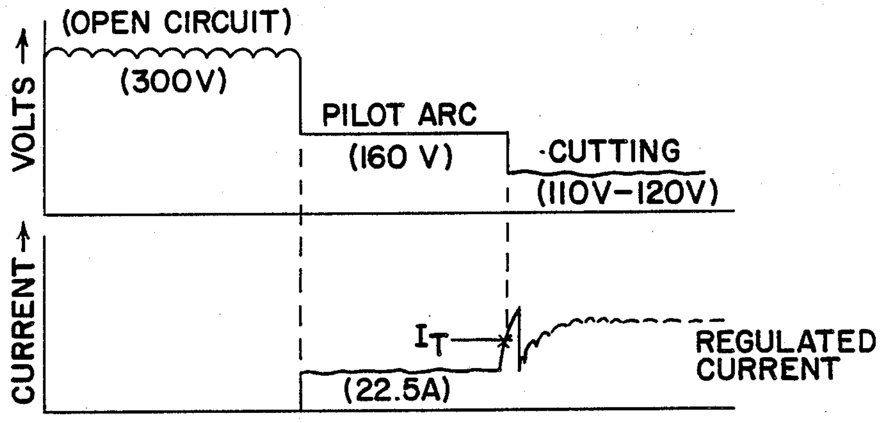
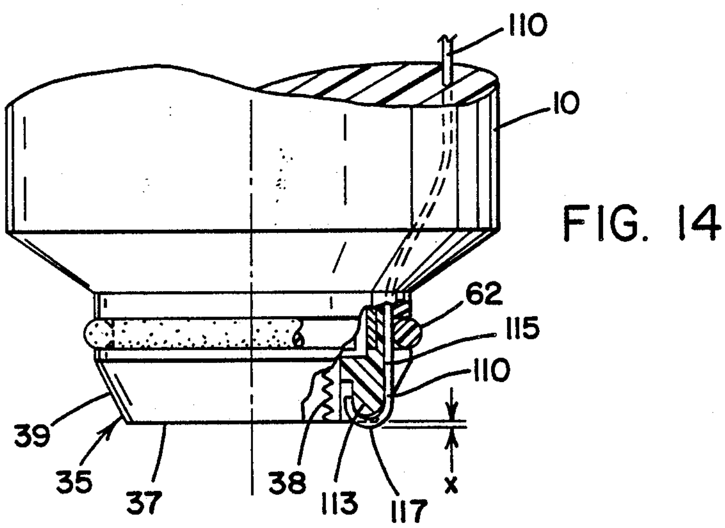
FIG. 14

PLASMA ARC TORCH INTERLOCK WITH DISABLING CONTROL ARRANGEMENT SYSTEM

This invention relates generally to plasma arc torch systems and more particularly to interlock and/or disabling arrangements associated with the torch nozzle which are used in plasma arc torch systems.

The invention is particularly applicable to a plasma arc torch cutting system which initially generates a pilot or starting arc between the torch nozzle and electrode and will be described with particular reference thereto. However, the invention may have broader application and could be applied to plasma arc torch cutting systems which generate a plasma arc without establishing an initial or pilot arc.

BACKGROUND OF THE INVENTION

Generally, torches of the type to which this invention relates supply an ionizable gas to the torch nozzle in front of a negatively charged electrode. A high d.c. voltage is applied to the electrode. A high voltage, high frequency AC signal is superimposed on the DC signal causing a spark to jump between the electrode and the torch nozzle which establishes an initial starting pilot arc. The pilot arc heats and ionizes the gas passing through the nozzle and establishes a plasma flow. When the nozzle of the torch is brought towards the workpiece, which has a lower impedance path than the torch nozzle, the pilot arc jumps from the nozzle to the workpiece establishing a plasma arc between the electrode and the workpiece. The plasma arc permits the torch to perform its appropriate function i.e., either cutting, welding or metal deposition.

In all plasma arc torch systems a nozzle is provided to enclose and shield the electrode (which is at a high voltage) against accidental grounding, to direct the flow of ionizable gases as a plasma against the workpiece and to constrict the plasma column giving a very high plasma temperature. Torch parts, in particular the torch nozzle, are "somewhat" consumable and must eventually be replaced. In particular, the pilot arc between the nozzle and the electrode will eventually wear away the nozzle. Also contributing to the wear of the nozzle is the heat from the ionized gases and to some extent the adverse effects of the heat eventually requires the electrode to be replaced. Accordingly, the nozzle and electrode are usually provided as replaceable parts which are threaded into the torch body so that the nozzle shields and encloses the electrode except for a small orifice through which the plasma arc passes. When the parts are to be replaced, they must, in fact, be replaced in a proper assembled relationship to one another to assure that the electrode is properly shielded to avoid accidental grounding which could occur if the torch was inadequately assembled without the nozzle present.

The prior art has recognized this problem and has proposed various solutions. For example, U.S. Pat. No. 4,663,515 to Kneeland et al. provides a nozzle which, if not in place, allows the gas pressure to rise. The rise in gas pressure is sensed and the power source disabled. U.S. Pat. No. 4,590,354 to Marhic and 4,682,005 to Marhic disclose protective nozzles surrounding the electrode and slideable into working contact by the pressure of the plasma gas. While such devices will disable the torch, in practice by the time the gas pressure is sensed or activated an arc can already be discharged. In addition, gas pressure sensing devices are expensive.

In U.S. Pat. No. 4,585,921 to Wilkins et al., incorporated herein by reference, a switch contact is established when a cone surrounding the nozzle is positioned in place. Unless the switch is activated, the power source is disabled. However, in the Wilkins device, the cone could be in place and the nozzle inadvertently deleted from the assembly. Thus the switch could be activated because the cone is in place but the electrode could be exposed. There thus remains a need to prevent any inadvertent arc discharge from a plasma arc torch unless the parts of the torch are assembled properly.

In all plasma arc torch systems, the main source of electrical power is transmitted to the electrode in the torch body by a main conductor encased within a cable which extends from the torch body to the power supply. The cable is susceptible to being punctured or severed by any one of a number of different metal objects which are always present within the confines of a shop environment. Such metal objects can contact the main conductor establishing the same type of electrically hazardous condition which could otherwise exist by an exposed electrode. Heretofore, attempts to address such problems have been directed towards producing a tough, durable and puncture resistant cable. Such cables increase the expense of the system and require periodic inspection and replacement.

Inherent in all plasma arc torch systems using a pilot arc, is the fact that the current in the arc increases momentarily when the pilot arc is transferred from the nozzle to the work as a plasma arc. When the arc transfer occurs, the arc momentarily travels from the electrode to the nozzle orifice adjacent the electrode and from the nozzle orifice to the work. This double arc deteriorates the nozzle eventually resulting in a larger nozzle orifice and exposing the electrode. The prior art has recognized this problem and has proposed various power circuits which decrease the current in the arc at the moment of transfer. One example of such a circuit is shown in U.S. Pat. No. 3,745,321 to Shapiro et al., incorporated herein by reference. While such circuits are somewhat responsive to the problem, there are either stability problems present or energy efficiency drawbacks associated therewith.

Apart from plasma arc torch systems, per se, the assignee of the present invention has utilized in its arc welding power source, a fault detect circuit which senses a short between the electrode and the nozzle and in response to a sensed voltage in excess of a predetermined value, disables the power source.

BRIEF SUMMARY OF THE INVENTION

It is thus a principal object of the present invention to provide a plasma arc torch system which possess interlock and/or disabling feature(s) which enhance the operation of the torch.

This object along with other features of the present invention is achieved in a plasma arc torch system suitable for conducting various torch processes on a workpiece which conventionally includes an electrical power source, a gas supply source for generating a plasma and a torch body including an electrode and a nozzle assembly circumscribing the electrode at a predetermined spaced distance therefrom. A conventional fault detect circuit is provided for sensing a short circuit between the nozzle assembly and the electrode and disabling the power source when a short circuit is detected. A cable connected to the torch body at one end and the power source at the opposite end houses a main electrical conductor transferring electrical power from the power source to the electrode in the torch body. Sensing means provided within the cable detects a puncture or a break in the cable which is severe enough to cause contact with the main conductor and, in response to such contact, actuates the fault detector circuit to disable the electrical power source. More specifically, the conventional fault detector circuit includes a pilot arc lead connected to the nozzle assembly at one end and at its other end to ground (work lead). When the power source is activated, activated, a pilot arc between the electrode and nozzle assembly is established and the voltage between the pilot arc lead and ground is measured through the fault detect circuit. The fault detect circuit disables the power source should the voltage exceed a predetermined value. The sensing circuit includes a continuous, electrically conductive shield embedded in the cable and circumscribing the main conductor and extending the length of the cable. A bare wire or drain lead is secured to the foil and attached to the pilot arc lead. When an electrically conductive object punctures the foil and makes contact with the main conductor, a short circuit is established and sensed by the fault detect circuit which disables the electrical power source.

In accordance with another aspect of the invention, the nozzle assembly includes a generally cylindrical nozzle sleeve member permanently embedded within the torch body and a replaceable cup shaped tip member adapted to be threadingly secured to the nozzle sleeve member. The pilot arc lead is affixed to the nozzle sleeve member. Within the torch body an electrically insulated, spring wire continuity contact is embedded. A continuity lead attached to a source of electrical power is connected to the continuity contact. When the nozzle tip is properly fastened to the nozzle sleeve an electrical connection is established between the continuity lead and the pilot arc lead and a circuit is provided for measuring continuity therebetween so that in response to a lack of continuity the power source is disabled. The continuity circuit in combination with the fault detect circuit thus insures a safe torch at all times. The nozzle cup tip member completely surrounds and shields the electrode and is always at a relatively lower potential, as previously described, so that if the nozzle cup tip member is in place, the torch is relatively safe. In addition, should the electrode be damaged or improperly inserted relative to the nozzle cup tip member or a foreign object wedge its way against the electrode so that contact with the nozzle cup tip member is made, the fault detect circuit will be actuated.

In accordance with yet another feature of the invention, the electrical source generates, through a thyristor bridge, a series of d.c. electrical pulses applied to the electrode to generate a pilot arc when the pilot arc switch is connected to ground. The amplitude of the current in each pulse is sensed and should a predetermined current level be exceeded, the output circuit generating the d.c. electrical pulses is phased back or retarded by a triggering circuit. In practice, as the pilot arc is transferred to the plasma arc, the amplitude of the last pulse in the pilot arc will exceed the predetermined current level which will actuate the triggering circuit to vary the phase angle and, accordingly the current. In accordance with a more specific aspect of the invention, a capacitor circuit is provided to sustain the plasma arc when the output circuit is phased back to reduce any hunting tendency of the output circuit. The capacitor circuit is similarly actuated when the triggering circuit is phased forward at the initiation of the pilot arc.

It is thus another object of the invention to provide an arrangement for a plasma arc torch which disables the torch should the cable be punctured.

It is another object of the present invention to provide an interlock feature for use in a plasma arc torch which insures that the torch will not be operational unless the torch is properly assembled.

It is yet another object of the invention to provide a control arrangement in a plasma arc cutting torch which prevents excessive arcing and wear of the nozzle.

It is another object of the present invention to provide a control arrangement for a plasma arc cutting torch which permits maximum efficient utilization of the power source to generate a plasma arc.

Yet still another object of the invention is to provide a plasma arc cutting torch which has inexpensive but reliable interlock and/or fault detect features.

Still another object of the invention is to provide an arrangement which prevents the torch from being used unless the electrode is completely shielded by the nozzle.

These and other objects of the invention will become apparent from a reading and understanding of the following description of the preferred embodiment.

BRIEF DESCRIPTION OF THE DRAWINGS

The invention may take physical form in certain parts and arrangement of parts a preferred embodiment of which will be described in detail and illustrated in the accompanying drawings which form a part hereof and wherein:

FIG. 6 is a schematic cross-sectional view of the cable used with the torch;

FIG. 7 shows the lead attached to the foil of FIG. 6;

FIG. 8 is a cross-sectional view of the lead of FIG. 7 taken along lines 8—8 of FIG. 7;

FIG. 9 is a graph of the voltage measured in the lead shown in FIGS. 7 and 8;

FIGS. 10 and 11 are schematic diagrams illustrating various circuits attached to the pilot arc lead which disable the power source;

FIG. 12 is a schematic of the basic circuit used in the torch system disclosed herein;

FIG. 13 is a graph illustrating the current and voltage developed by the torch as it develops a plasma arc; and FIG. 14 is a plan view of a portion of the torch tip, partly in section, illustrating a spring contact used in the invention.

DETAILED DESCRIPTION OF THE PREFERRED EMBODIMENT

Figure 1:
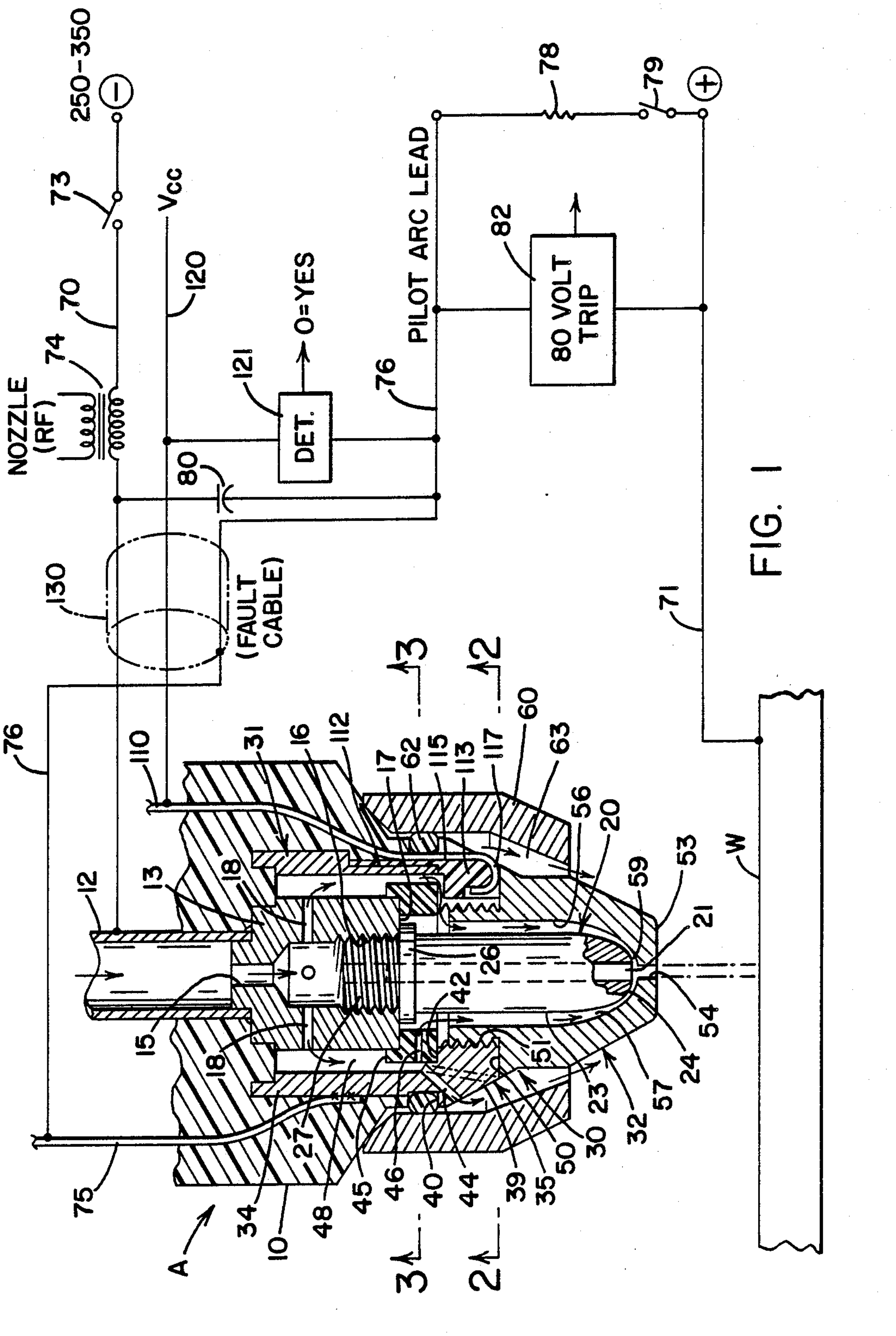
FIG. 1 shows a cross-sectional elevation view of a plasma arc torch body connected and a schematic diagram showing a plasma arc torch system.
Figure 2:
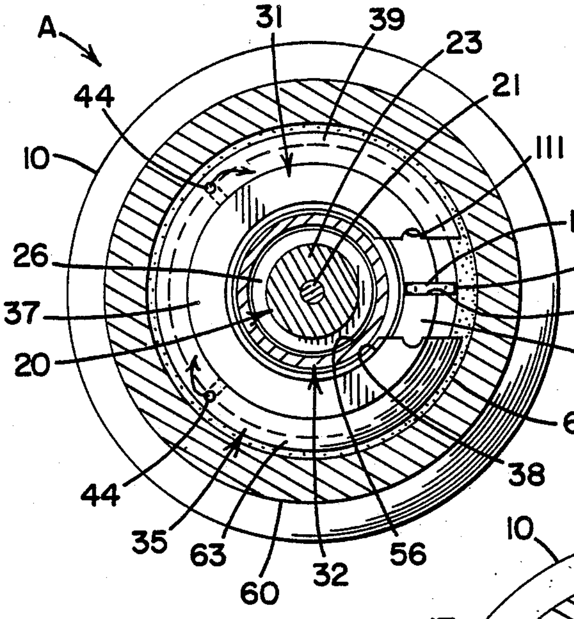
FIGS. 2 and 3 are cross-sectional views of the torch body taken along lines 2—2 and 3—3 respectively of FIG. 1.
Figure 3:
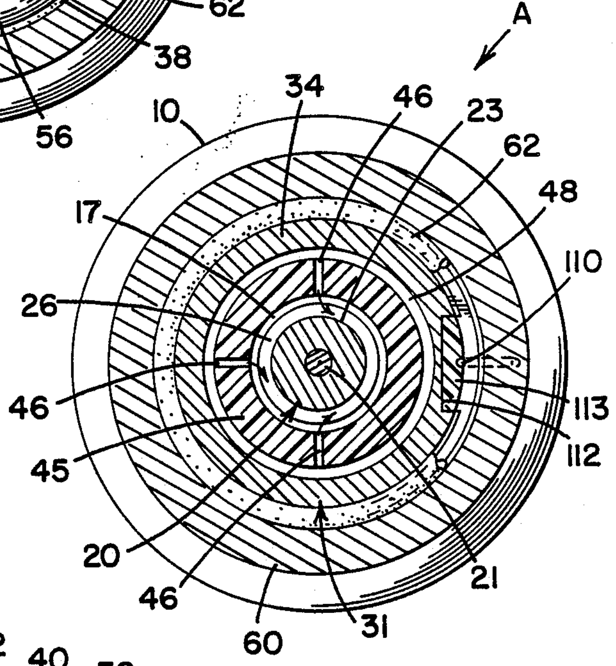

Referring now to the drawings wherein the showings are for the purpose of illustrating a preferred embodiment of the invention only and not for the purpose of limiting the same, the plasma arc torch generally designated as "A" is shown in FIGS. 1 through 5 to comprise a generally hard, electrically insulated, plastic torch body 10 which is formed (not shown) into an appropriate configuration as a hand-held grip. Within torch body 10 an appropriate plasma gas line 12 is provided through which an appropriate ionizable gas, such as air, is supplied to plasma arc torch "A". Gas line 12 is in fluid communication with a metal gas distributor 13 which has a central passageway 15 extending therethrough. One end of central passageway 15 is internally threaded as at 16. The internal threads 16 continuing to the end of gas distributor 13 which forms a flat seating surface 17. A plurality of radially extending gas distribution passages 18 intersect with central passageway 15 for distributing the plasma gas out the sides of the gas distributor 13 as shown by the arrows in FIG. 1.

An electrode 20 in the form of a hafnium wire 21 is embedded a metal cylindrically shaped housing 23 having a rounded end 24 and an annular shoulder 26 at its opposite end from which extends an externally threaded boss 27. Boss 27 is threaded into gas distributor 13 until shoulder 26 seats against flat seating surface 17 of gas distributor 13.

Figure 4:
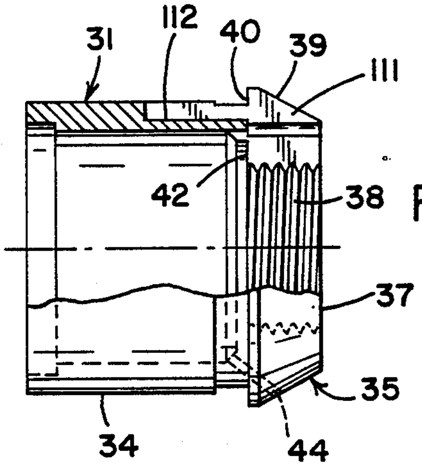
FIG. 4 is a plan view, partly in section, of a part used in the torch.
Figure 5:
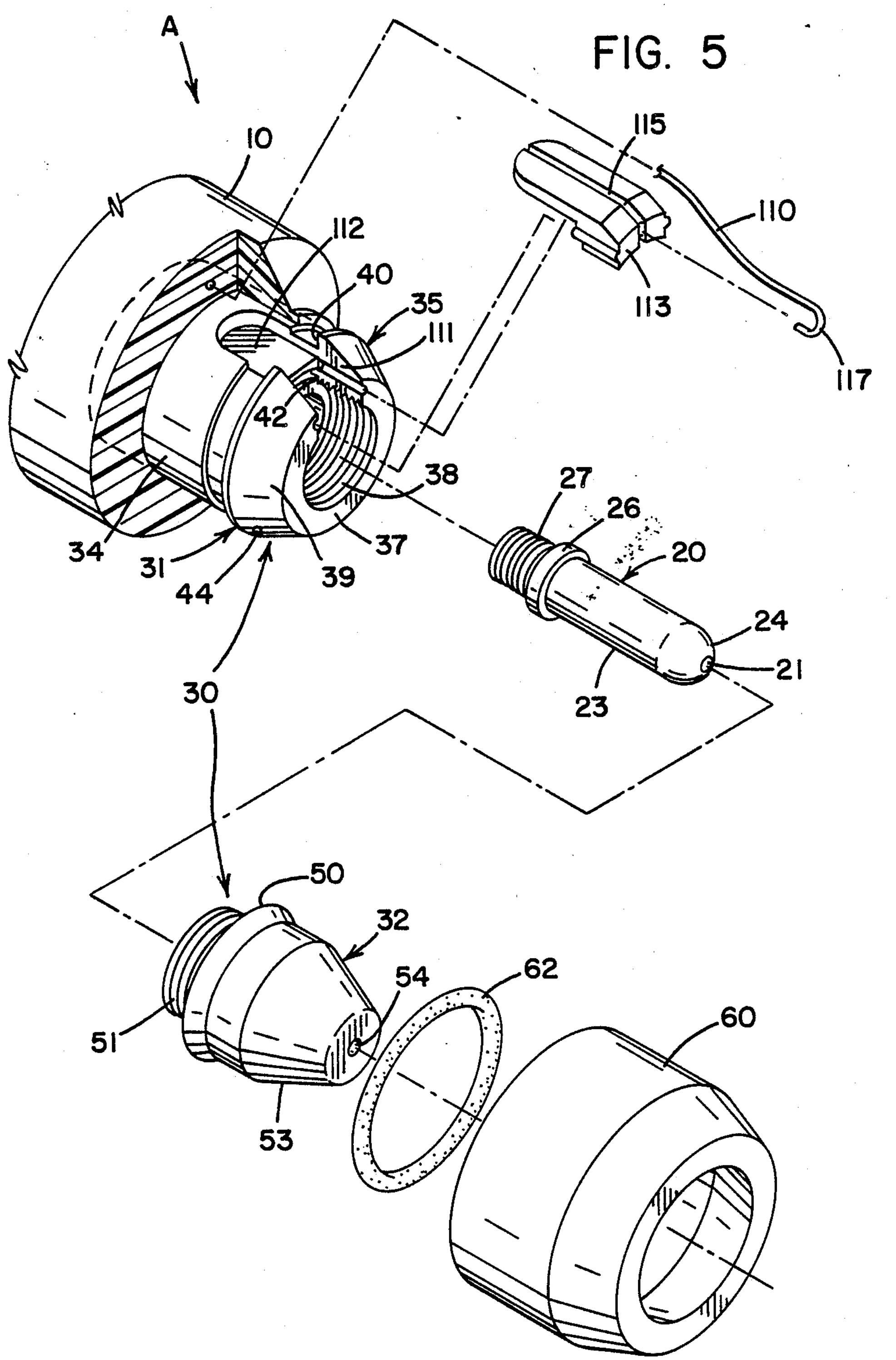
FIG. 5 is an exploded perspective view of the torch body assembly.

A nozzle assembly 30 comprising a nozzle sleeve member 31 and a nozzle cup tip member 32 surrounds gas distributor 13 and electrode 20. As best shown in FIGS. 1, 4 and 5, nozzle sleeve member 31 has a cylindrical base portion 34 which circumscribes gas distributor 13 which is embedded within plastic torch body 10. Base portion 34 terminates in an annular contact ring portion 35.

Ring portion 35 has an annular flat contact base surface 37, and an internally threaded central opening 38 extending from the inside diameter of annular contact base surface 37 and an outwardly flared frusto-conical surface 39 extending from the outer diameter of annular contact base surface 37 and forming an external shoulder 40 with cylindrical base portion 34. An internal annular shoulder 42 is also formed in ring portion 35 adjacent the intersection of ring portion 35 with cylindrical base portion 34. At least one gas passage 44 extends through ring portion 35 to provide fluid communication between the inside and outside of nozzle sleeve member 31. An annular electrically insulated, plastic seating ring 45 is seated at one end against internal annular shoulder 42 and at its other end against flat seating surface 17 of metal gas distributor 13. Annular seating ring 45 thus precisely positions gas distributor 13 and electrode 20 in an electrically insulated, fixed spatial relationship relative to nozzle sleeve member 31. Radially extending gas passages 46 extend from the outer to the inner cylindrical walls of seating ring 45. As described thus far, an annular passage 48 is formed between cylindrical base portion 34 of nozzle sleeve member 31 and gas distributor 13. Gas travels from radially extending passageways 18 in gas distributor 13 into the annular passage 48 and thence through radially extending gas passages 46 against electrode cylindrical housing 23 whereat the gas is ionized or, alternatively, through gas passages 44 in ring portion 35 for metal removal purposes while, incidentally, cooling nozzle assembly 30.

As noted, nozzle assembly 30 includes nozzle cup shaped tip member 32 which has an annular contact base surface 50 from which extends an externally threaded sleeve 51 which is adapted to be threadingly secured to internally threaded central opening 38 of nozzle sleeve member 31. The bottom portion 53 of nozzle cup shaped tip member 32 has an axially extending orifice 54 slightly smaller than but aligned with electrode wire 21. The interior surface 56 of nozzle cup tip member 32 is configured to somewhat resemble the shape of electrode cylindrical housing 23 and a spark jumping space 57 exists between interior surface 56 of nozzle cup tip member 32 and electrode cylindrical housing 23 both of which are smoothly curved. Within spark jumping space 57 a spark is formed and the spark migrates very quickly to pilot arc space 59 which is adjacent rounded end 24 of electrode cylindrical housing 23 whereat the pilot arc is established. In point of fact, pilot arc space 59 is a maximum space within spark jumping space 57, it being found that such an arrangement enhances the cutting ability of the torch.

Finally, a gas cooling sleeve 60 fits over nozzle assembly 30 by means of an O-ring 62 which is sealingly compressed between shoulder 40 of contact ring portion 35 of nozzle sleeve member 31, torch body 10 and the interior surface of cooling sleeve 60. The configuration of gas cooling sleeve 60 in combination with that of nozzle assembly 30 directs or focuses a fine gas jet stream on the cut in the work specimen formed by the plasma arc to remove metal. Secondarily, the configuration of frusto-conical surface 39, the exterior shape of nozzle cup tip member 32, the orientation of gas passages 44 and the internal configuration of gas cooling sleeve 60 is such that the flow of the gas stream through gas passages 44 and a space 63 between cooling sleeve 60 and nozzle assembly 30 produces a slightly turbulent gas flow which enhances cooling of the nozzle assembly 30, the enhanced gas cooling continued by directing the gas as a jet stream tangential to the face of cup shaped tip member 32 as the gas leaves cooling space 63 which is done, as noted, principally to focus the gas jet accurately on the work for metal removal purposes.

Referring now to FIG. 1, a 250–350 volt d.c. power supply is connected across torch "A" and the workpiece "w". A cathode lead 70 connects the d.c. negative to electrode 20 vis-a-vis the main power source conductor (although for illustration purposes, cathode lead 70 is shown connected to plasma gas line 12) to electrode 20 vis-a-vis metal gas distributor 13. A work lead 71 is connected to the positive terminal of the electrical power source. A main power switch 73 is inserted in cathode lead 70 for turning on and off the main power source and an RF transformer 74 is also provided relative to cathode lead 70 which assists in the starting of the pilot arc. A pilot arc wire contact 75 is embedded in torch body 10 in an electrically insulated manner and affixed to and in electrical contact with cylindrical base portion 34 of nozzle sleeve member 31. A pilot arc lead 76 connects pilot arc wire contact 75 to positive ground through a three ohm resistor 78 and a pilot arc switch 79. A capacitor 80 is connected across cathode lead 70 and pilot arc lead 76 between electrode 20 and RF transformer 74 and an 80 volt fault detect circuit 82 is connected across pilot arc lead 76 to ground or work lead 71.

As described thus far, the torch circuitry is somewhat conventional. A trigger on torch "A" (not shown) is actuated to actuate pilot arc switch 79 and power switch 73 ("switch" is used here in its functional sense. Actually switches 73, 79 are contacts opened or closed by the trigger). Alternatively, if desired to have the operator sequentially actuate switches 79, 73, the trigger could be actuated twice, first to actuate pilot arc switch 79 and then to actuate power switch 73. With both switches closed, approximately 300 open circuit volt potential is applied to electrode 20 and a pilot arc is formed in spark jumping space 57 and quickly migrates to pilot arc space 59. Capacitor 80 is sized relative to RF transformer 74 to quickly charge and discharge so as to maintain the pilot arc. The voltage sensed at pilot arc lead 76 when a pilot arc is established is about 66 volts. With plasma arc torch "A" in its pilot arc or initial start up mode, the gas leaving nozzle orifice 54 is ionized and heated by the pilot arc to develop a plasma and plasma arc torch "A" is then lowered by the operator towards work "W". As nozzle cup tip member 32 approaches work "W", the pilot arc will jump from nozzle cup tip member 32 to the work "W" which is at a lower impedance than that of nozzle cup tip member 32 via resistor 78. When the pilot arc transfers from nozzle cup tip member 32 to the work "W", a plasma arc will be established.

As noted, the pilot arc voltage sensed in the pilot arc lead during normal maintenance of the pilot arc will, for reasons hereafter explained, always be less than the plasma arc voltage and for the particular torch illustrated will be approximately 66 volts. When an electrode to nozzle short occurs for any reason, the full open circuit potential, 250-350 volts, will be applied across the nozzle assembly 30 which can be sensed at the pilot arc lead 76. Accordingly, a fault detect circuit 82 which is set to trip at about 80 volts to avoid nuisance fault detection due to momentary double arcing or transience is provided. When actuated, fault detect circuit 82 disables the main power source and is conventional.

Two conventional circuits which can be used as fault detect trip circuit 82 are shown in FIGS. 10 and 11. The circuit shown in FIG. 10 uses an integrator 84 to calculate the rate of change of voltage over a discrete time period, i.e. one-half second for example. Integrated function dv/dt (or alternatively di/dt) is then compared against a limiting value in a comparator circuit 85 and if the limiting value of the comparator 85 is exceeded, an appropriate disabling circuit 87 shuts off the main power supply. Reference may be had to assignee's U.S. Pat. No. 4,717,807, incorporated herein by reference, for examples for various integrator and comparator circuits measuring dv/dt (or di/dt) and disabling the power supply when compared against predetermined maximum limits. This circuit works because the rate of change of voltage when a short is sensed will be faster than that which would occur when the pilot arc is established. A simpler circuit is shown in FIG. 11 which essentially comprises charging a capacitor 88 through a resistor 89 connected between ground or work lead 71 and pilot arc lead 76. When a short is sensed, a larger voltage is applied across the capacitor and the capacitor is discharged. In the process of discharging, capacitor 88 actuates a trip circuit 90.

The general circuit for the plasma arc control system is shown in FIG. 12 and includes a thyristor or SCR rectifier bridge 92 connected to the secondary of a transformer (not shown) of a three phase a.c. power supply (not shown). The rectified output of SCR bridge 92 is passed through a shunt 93 and then through the RF transformer 74 to electrode 20. In parallel with SCR bridge 92 is a stabilizing circuit 95 including a capacitor 96 charged through a diode 97 and discharged through a resistor 98 which is in connected in parallel with diode 97. The gates for SCR bridge 92 are controlled by a conventional triggering circuit 100 which opens or phases forward or backwards the gates of the SCR's in bridge 92 to vary the energy content of the electrical pulses (and accordingly the current) in a conventional manner. The time during which the gates are opened or phased back by triggering circuit 100 is controlled through a phase back circuit 101. Phase back circuit 101 in turn is actuated by the pilot or initial arc start mode and the current or voltage differential sensed in shunt 93.

Referring now to FIG. 13, the graph schematically illustrates that the power source generates a pulsed output when the main power switch 73 is actuated having an open circuit voltage of about 300 volts. When pilot switch 79 is closed, a pilot or start up arc having about 160-170 volts potential at a current draw of about 22½ amps is generated. When the pilot arc is transferred to the work as a plasma arc, the plasma arc will have a potential of about 110-120 volts and an attendant rise in current. When the pilot arc is established, the thyristors must be phased forward through phase back circuit 101 to near full conduction to achieve a high enough voltage to start the arc. When the arc is transferred as a plasma arc, the current flowing through the arc will rise and the voltage of the plasma arc will drop to about 110-120 volts. This means that the thyristors must be phased back through phase back circuit 101, typically about 25 degrees for the torch under discussion (i.e. this depends on the set point of the machine), immediately upon detecting a current in that pulse which exists when the pilot arc transfers to the work "W" which is higher than that expected for operation of the pilot arc. If the phasing back does not occur, the current within the torch will rise, the arc will not be constricted and will damage the nozzle cup tip member 32 as it passes through opening or orifice 54.

Generally speaking, there is a limitation to the amount that an arc can be constricted in any given torch which is determined generally by air pressure, air flow, orifice size and current. The current is the only variable that can be controlled by the power supply and when an arc of a certain size formed by given current value is restricted by too small a nozzle orifice 54 in the torch, the current in the arc will first pass to the nozzle cup tip member 32 at the edge of nozzle orifice 54 and then to the work "W" at the outside of the orifice. This action erodes the orifice until the orifice becomes large enough to allow the arc to pass through. At that time the electrode is exposed and nozzle cup tip member 31 must be replaced. Accordingly, the circuit of FIG. 12 phases forward triggering circuit 100 while the torch is in its pilot arc cutting mode and the moment that the pilot arc transfers to a plasma arc, the current rise sensed in that electrical pulse through shunt 93 operates to immediately phase back the thyristors. When the phase back occurs, the control system will be somewhat unstable and tend to hunt until the current seeks its regulated level as shown in the plasma arc current portion of the curve in FIG. 13. To stabilize the system and prevent the arc from becoming extinguished the capacitor 96 is discharged through resistor 98 for a sufficient period of time (generally about 12 milliseconds) to sustain the arc. This also occurs, to a somewhat lesser extent, when the pilot arc is initially established. Thus, the circuit described in FIG. 12 minimizes arc damage to nozzle tip member 22, stabilizes the electrical system both at the time the pilot arc is initiated and at the time the pilot arc is transferred as a plasma arc to the work while optimizing or conserving the energy available from the power supply by minimizing the degree of phase back of the SCR's.

Referring again now to FIGS. 1-5 and 14, there is shown a continuity spring wire contact 110 which is embedded within torch body 10 and forms a portion of nozzle sleeve member 31. More particularly, nozzle sleeve member 31 has a segment 111 of its contact ring portion 35 and an adjacent segment 112 of its base portion 34 removed into which a plastic, electrically insulated segment block 113 is inserted, the exterior surface of segment block 113 configured to provide a continuous and smooth exterior surface for contact ring portion 35. A groove 115 is formed in segment block 113 for receiving a crimped end 117 of continuity spring wire contact 110. As best shown in FIG. 14, spring wire contact 110 is formed relative to groove 115 to permit movement of crimped end 117 a distance shown as "x" relative to groove 115 when annular contact base surface 50 of nozzle cup tip member 32 is firmly threaded into nozzle sleeve member 31. This assures a good electrical contact. A continuity lead 120 is connected to continuity spring wire contact 110 and a continuous circuit voltage shown as $V_{cc}$ in FIG. 1 of about 15 volts at a current of 50–100 milliamps is applied to continuity lead 120. When nozzle cup tip member 32 is properly positioned, current flows through continuity lead 120, continuity spring wire contact 110, nozzle cup tip member 32, nozzle sleeve member 31, pilot arc wire contact 75 and thence through pilot arc lead 76. Accordingly, a device or continuity circuit 121 can be inserted in the circuit to check its continuity or to measure the voltage difference between the pilot arc lead 76 and continuity lead 120 and should there be a voltage differential or should a minimum current flow not be recorded the power source can be disabled.

Referring now to FIGS. 1 and 6 through 9, there is shown a cable 130 which is attached at one end to torch body 10 (not shown) and at its other end to the power source (also not shown). Embedded within the cable is a gas line 12 for carrying the shielding/cooling/cutting plasma gas, a main conductor 132 which in turn is encased within a protective jacket 133 for carrying arc current, a collection of control leads 134 similarly encased with a protective jacket 135 for various torch purposes such as triggering the switches, establishing current to the continuity spring wire contact 110, etc. Each of the aforementioned conductors is embedded in a pliable plastic insulating coating 137 to which is secured a metal foil or shield 138 which runs the length of the cable 130 and importantly completely surrounds or circumscribes at least main conductor 132. Secured to shield 138 is a drain lead 140 which is a bare wire running the entire length of the cable and which is connected to the pilot arc wire contact 75 within torch body 10. Surrounding the outside of shield 138 is a pliable plastic insulating coating 141 which is a flexible thermoplastic material "cross-linked" with an electron beam process to make it resistant to abrasion and tough.

As shown in FIGS. 6, 8 and 9 if the cable 130 is punctured or cut by any electrically conductive matter such as that shown at 150 and the puncturing device after penetrating shield 138 cuts through jacket 133 to establish contact with main conductor 132, a short between drain lead 140 and main conductor 132 will be sensed and the short so detected by this sensing circuit will be conveyed to pilot arc wire contact 75 and thence to pilot arc lead 76 to fault detect circuit 82. Fault detect circuit 82 will register an open circuit voltage of approximately 300 volts and will disable the power source in the same manner that the circuit would have been actuated if a short was detected at nozzle assembly 30. The puncture detection feature or sensing circuit of the invention is active whether or not pilot arc switch 79 is or is not actuated.

There has thus been disclosed several features applicable to a plasma arc torch system which are somewhat interdependent and related to one another. For example, a conventional fault detect circuit capable of detecting nozzle-electrode short circuits and disabling the power source, is used to detect puncture or other severance of the torch cable. Similarly, an electrical interlocking circuit combined with a fault detect circuit is used to provide a safe torch in that nozzle in place sensing is combined with a nozzle voltage sensing to insure a safe torch under all conditions of operation. Finally, an SCR trigger circuit is used to disable the output when the arc is transferred so that the nozzle is not eroded away at its orifice to expose the electrode.

It is apparent that many modifications may be incorporated into the circuits and arrangements disclosed without departing from the spirit or essence of the invention. It is my intention to include all such modifications and alterations insofar as they come within the scope of the present invention.

It is thus the essence of my invention to provide a safe plasma arc torch cutting system which enhances the durability and reliability of the plasma arc torch.

Having thus defined my invention, I claim:

1. A plasma arc torch system for effecting various metal processes on a workpiece comprising:

an electrical power source;

a gas supply source for generating a plasma;

a torch body including an electrode and an insulated, electrically conductive nozzle assembly circumscribing said electrode at a fixed distance therefrom;

fault detect circuit means including a pilot arc lead connected to the nozzle assembly at one end and at its other end to ground for sensing a short circuit between said nozzle assembly and said electrode and disabling said power source in response thereto;

a cable connected to said torch body, a main electrical conductor within said cable connected at one end to said electrode and at its other end to said power source; and sensing means within said cable detecting a puncture of the cable sufficient to contact said main conductor and in response to said contact actuating said fault detect circuit means to disable said power source; said sensing means including a continuous, electrically conductive shield circumscribing the main conductor and a drain lead in electrical contact with said shield and said pilot arc lead so that a short between the drain lead and main conductor will be sensed and conveyed to pilot arc lead to actuate said fault detect circuit means.

2. The plasma arc torch system of claim 1 wherein said torch body includes a pilot arc contact wire in electrical contact with said nozzle assembly and said drain lead, a pilot arc switch, a pilot arc lead connected to said fault detect circuit means and said pilot arc switch and said pilot arc contact wire, a main power switch between said electrode and said power source, said fault detect circuit means actuated when said pilot arc switch and said main power switch are activated to establish a pilot arc between said nozzle assembly and said electrode and a predetermined voltage measured relative to said pilot arc lead is exceeded.

3. The plasma arc torch system of claim 2 wherein said fault detect circuit is effective to disable said power source when said pilot arc switch is open and when said sensing means is activated.

4. The plasma arc torch system of claim 2 wherein said electrode is a cathode, said workpiece represents ground potential, said power source supplies a d.c. voltage of about 250–350 volts to said electrode, said pilot arc switch connected to said ground potential and said predetermined value is the voltage sensed between said pilot arc lead relative to said ground potential.

5. The plasma arc torch system of claim 4 wherein said predetermined value is not less than about 66 volts and not more than about 250 volts.

6. The plasma arc torch system of claim 5 wherein said cable has a generally cylindrical outer jacket of an insulating, pliable plastic material; said shield comprises a metal foil embedded in said jacket; said drain lead comprises a bare wire extending the length of said cable and in contact with said foil; said main conductor contained in an insulated, plastic coating so that said outer jacket must be initially pierced and said coating must be subsequently punctured by an electrically conductive object extending therebetween before said sensing means is actuated.

7. The plasma arc torch system of claim 1 wherein said nozzle assembly includes a generally cylindrical nozzle sleeve member within said torch body and a cup shaped tip member adapted to be threadingly secured to said nozzle body, said drain lead affixed as a pilot arc wire contact to said nozzle sleeve body member;

a continuity lead within said torch body, a continuous circuit source of electrical power connected to said continuity lead, said cup shaped tip member when properly fastened to said body establishing an electrical connection therethrough from said continuity lead to said drain lead and continuity circuit means measuring continuity between said continuity lead and said pilot arc wire contact so that in response to a lack of continuity therebetween said main power source is disabled.

8. The plasma arc torch system of claim 7 wherein said nozzle sleeve member has an annular contact ring portion protruding from the torch body with an internally threaded central opening and a generally flat face surface, and a cylindrical base portion extending from the opposite side of said ring portion and fixedly secured within said torch body, said ring portion having an electrically insulated segment formed therein and a groove within said insulated segment, said continuity lead in the form of a continuity spring wire contact extending within said groove and protruding beyond said face of said base portion when said nozzle assembly is in an unassembled position, and said nozzle cup shaped tip member having an annular contact base surface and an externally threaded sleeve extending from said contact surface and adapted to be threadingly engaged with said internally threaded central opening of said nozzle sleeve member whereby said contact base surface seats against said flat face surface and moves said continuity spring wire contact within said groove when said cup shaped tip is properly secured to said nozzle body member, thereby establishing continuity for measurement by said continuity circuit means.

9. The plasma arc torch system of claim 8 further including a gas conduit within said torch body, a gas distributor block in fluid communication at one end with the outlet of said gas conduit and positioned within said cylindrical base portion of said nozzle sleeve member, an insulating annular seating ring member between said gas distributor and said ring portion of said nozzle sleeve member electrically isolating said gas distributor from said nozzle sleeve member, said gas distributor having a base with an internally threaded opening adjacent said ring portion;

said electrode having a cylindrical body portion with a rounded end, an annular shoulder at one end of said cylindrical body portion and an externally threaded end extending from said shoulder, said externally threaded end of said electrode threadingly engaged with said internally threaded opening of said gas distributor;

said cup shaped nozzle tip member internally configured to closely match said cylindrical body portion of said electrode to define an electrode spark space therebetween, said space gradually increasing to a maximum spark distance at a point generally adjacent said rounded end of said electrode's cylindrical body portion and having a nozzle orifice centrally positioned therein;

said insulating seating ring having gas passages in fluid communication with said electrode spark space; said gas distributor block having gas passages in communication with said gas conduit and a space between said gas distributor block and said cylindrical base portion of said nozzle sleeve member whereby an ionizable gas is injected through said orifice.

10. The plasma arc torch system of claim 9 further including a gas cooling cup circumscribing a portion of said nozzle cup shaped tip member and sealing means to secure said cup to said torch body;

said ring portion of said nozzle sleeve member having at least one gas passage in fluid communication with a space between said cooling cup and said nozzle cup shaped tip member whereby a portion of the gas leaving said gas conduit is directed against said nozzle cup shaped tip member for focusing gas into the cut zone of the work for removing melted metal while also incidentally cooling said nozzle cup shaped tip member.

11. The plasma arc torch system of claim 1 further including rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the phase angle of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses.

12. The plasma arc torch system of claim 11 further including stabilizing means to sustain said plasma arc when said sensing means actuates said triggering means to reduce the phase angle of said pilot arc pulses.

13. The plasma arc torch system of claim 12 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

14. The plasma arc torch system of claim 13 wherein said stabilizing means includes a capacitor in series with a diode for charging thereof and a resistor in parallel with said diode for discharging said capacitor, said capacitor of sufficient size to provide sufficient current to sustain said pilot arc for about 12 milliseconds.

15. The plasma arc torch system of claim 14 wherein said triggering means to vary the phase angle retards the rectification of said electrical pulses in said plasma arc mode by about 25°.

16. The plasma arc torch system of claim 12 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

17. The plasma arc torch system of claim 7 further including rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the frequency and current of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses.

18. The plasma arc torch system of claim 17 further including stabilizing means to sustain said plasma arc when said sensing means actuates said triggering means to reduce the phase angle of said pilot arc pulses.

19. The plasma arc torch system of claim 17 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

20. The plasma arc torch system of claim 19 wherein said stabilizing means includes a capacitor in series with a diode for charging thereof and a resistor in parallel with said diode for discharging said capacitor, said capacitor of sufficient size to provide sufficient current to sustain said pilot arc for 12 milliseconds.

21. The plasma arc torch system of claim 20 wherein said triggering means to vary the phase angle retards the rectification of said electrical pulses in said plasma arc mode by about 25°.

22. The plasma arc torch system of claim 18 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

23. The plasma arc torch system of claim 1, wherein said drain lead comprises a bare wire extending the length of said cable and in contact with said foil.

24. A plasma arc torch system for effecting various metal processes on a workpiece comprising:

an electrical power source;

a gas supply source for generating a plasma;

a torch body including an electrode and an electrically conductive nozzle assembly circumscribing said electrode at a fixed distance therefrom;

fault detect circuit means for sensing a short circuit between said nozzle assembly and said electrode and disabling said power source in response thereto;

a cable connected to said torch body, a main electrical conductor within said cable connected at one end to said electrode and at its other end to said power source;

sensing means within said cable detecting a puncture of the cable sufficient to contact said main conductor and in response to said contact actuating said fault detect circuit means to disable said power source;

said sensing means includes a continuous, electrically conductive shield comprised of a metal foil embedded in said cable and circumscribing said main conductor and extending the length of said cable; and a drain lead in electrical contact with said shield and said nozzle assembly, said sensing means actuated when any electrically conductive object punctures said shield and contacts said main conductor thus establishing a short circuit between said electrode and said nozzle;

said cable has a generally cylindrical outer jacket of an insulating, pliable plastic material; said shield comprises a metal foil embedded in said jacket; said drain lead comprises a bare wire extending the length of said cable and in contact with said foil; said main conductor contained in an insulated, plastic coating so that said outer jacket must be initially pierced and said coating must be subsequently punctured by an electrically conductive object extending therebetween before said sensing means is actuated.

25. In a plasma arc torch system including an electrical power source, a torch body having an electrode and an insulated, electrically conductive nozzle assembly circumscribing said electrode at a fixed distance therefrom, a fault detect circuit means including a pilot arc lead connected to the nozzle assembly at one end and at its other end to ground for sensing a short circuit between said nozzle assembly and said electrode and disabling said power source in response to a short detected thereby; and a disabling mechanism comprising:

a cable connected to said torch body, a main electrical conductor within said cable connected at one end to said electrode and at its other end to said power source; and sensing means within said cable detecting a puncture of the cable sufficient to contact said main conductor and in response to said contact actuating said fault detect circuit means to disable said power source, said sensing including a continuous, electrically conductive shield circumscribing the main conductor and a drain lead in electrical contact with said shield and said pilot arc lead so that a short between the drain lead and main conductor will be sensed and conveyed to said pilot arc lead to actuate said fault detect circuit means.

26. The plasma arc torch system of claim 25 wherein said torch body includes a pilot arc contact wire in electrical contact with said nozzle assembly and said drain lead, a pilot arc switch, a pilot arc lead connected to said fault detect circuit means and said pilot arc switch and said pilot arc contact wire, a main power switch between said electrode and said power source, said fault detect circuit means actuated when said pilot arc switch and said main power switch are activated to establish a pilot arc between said nozzle assembly and said electrode and a predetermined voltage measured relative to said pilot arc lead is exceeded for a given time period, said electrode is a cathode, said workpiece represents ground potential, said power source supplies a d.c. voltage of about 250–350 volts to said electrode, said pilot arc switch connected to said ground potential and said predetermined value is the voltage sensed between said pilot arc lead relative to said ground potential and said predetermined value is not less than about 66 volts and not more than about 250 volts.

27. The plasma arc torch system of claim 25 wherein said nozzle assembly includes a generally cylindrical nozzle sleeve member within said torch body and a cup shaped tip member adapted to be threadingly secured to said nozzle body, said drain lead affixed as a pilot arc wire contact to said nozzle sleeve body member;

said torch further includes a continuity lead within said torch body, a continuous circuit source of electrical power connected to said continuity lead, said cup shaped tip member when properly fastened to said body establishing an electrical connection therethrough from said continuity lead to said drain lead and continuity circuit means measuring continuity between said continuity lead and said pilot arc wire contact so that in response to a lack of continuity therebetween said main power source is disabled.

28. The plasma arc torch system of claim 27 wherein said nozzle sleeve member has an annular contact ring portion protruding from the torch body with an internally threaded central opening and a generally flat face surface, and a cylindrical base portion extending from the opposite side of said ring portion and fixedly secured within said torch body, said ring portion having an electrically insulated segment formed therein and a groove within said insulated segment, said continuity lead in the form of a continuity spring wire contact extending within said groove and protruding beyond said face of said base portion when said nozzle assembly is in an unassembled position, and said nozzle cup shaped tip member having an annular contact base surface and an externally threaded sleeve extending from said contact surface and adapted to be threadingly engaged with said internally threaded central opening of said nozzle sleeve member whereby said contact base surface seats against said flat face surface and moves said continuity spring wire contact within said groove when said cup shaped tip is properly secured to said nozzle body member, thereby establishing continuity for measurement by said continuity circuit means.

29. The plasma arc torch system of claim 28 further including a gas conduit within said torch body, a gas distributor block in fluid communication at one end with the outlet of said gas conduit and positioned within said cylindrical base portion of said nozzle sleeve member, an insulating annular seating ring member between said gas distributor and said ring portion of said nozzle sleeve member electrically isolating said gas distributor from said nozzle sleeve member, said gas distributor having a base with an internally threaded opening adjacent said ring portion;

said electrode having a cylindrical body portion with a rounded end, an annular shoulder at one end of said cylindrical body portion and an externally threaded end extending from said shoulder, said externally threaded end of said electrode threadingly engaged with said internally threaded opening of said gas distributor;

said cup shaped nozzle tip member internally configured to closely match said cylindrical body portion of said electrode to define an electrode spark space therebetween, said space gradually decreasing to a minimum spark distance at a point generally adjacent said rounded end of said electrode's cylindrical body portion and having a nozzle orifice centrally positioned therein;

said insulating seating ring having gas passages in fluid communication with said electrode spark space; said gas distributor block having gas passages in communication with said gas conduit and a space between said gas distributor block and said cylindrical base portion of said nozzle sleeve member whereby an ionizable gas is injected through said orfice.

30. The plasma arc torch system of claim 29 further including a gas cooling cup circumscribing a portion of said nozzle cup shaped tip member and sealing means to secure said cup to said torch body;

said ring portion of said nozzle sleeve member having at least one gas passage in fluid communication with a space between said cooling cup and said nozzle cup shaped tip member whereby a portion of the gas leaving said gas conduit is directed against said nozzle cup shaped tip member for focusing gas into the cut zone of the work for removing melted metal while also incidentally cooling said nozzle cup shaped tip member.

31. The plasma arc torch system of claim 25 further including rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the phase angle and current of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses.

32. The plasma arc torch system of claim 31 wherein said rectifier means which generate said electrical pulses includes a three-phase a.c. power supply, transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means; and further including stabilizing means to sustain said plasma arc when said sensing means actuates said triggering means to reduce the phase angle of said pilot arc pulses.

33. The plasma arc torch system of claim 32 wherein said stabilizing means includes a capacitor in series with a diode for charging thereof and a resistor in parallel with said diode for discharging said capacitor, said capacitor of sufficient size to provide sufficient current to sustain said pilot arc for about 12 milliseconds, and said triggering means to vary the phase angle retards the rectification of said electrical pulses in said plasma arc mode by about 25°.

34. The plasma arc torch system of claim 27 further including rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the phase angle and current of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses.

35. The plasma arc torch system of claim 34 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means; and further including stabilizing means to sustain said plasma arc when said sensing means actuates said triggering means to reduce the phase angle of said pilot arc pulses.

36. The plasma arc torch system of claim 35 wherein said stabilizing means includes a capacitor in series with a diode for charging thereof and a resistor in parallel with said diode for discharging said capacitor, said capacitor of sufficient size to provide sufficient current to sustain said pilot arc for about 12 milliseconds, and said triggering means to vary the phase angle retards the rectification of said electrical pulses in the phase angle plasma arc mode by about 25°.

37. The plasma arc torch system of claim 25, wherein said drain lead comprises a bare wire extending the length of said cable and in contact with said foil.

38. A plasma arc torch system including an electrical power source, a torch body having an electrode and an electrically conductive nozzle assembly circumscribing said electrode at a fixed distance therefrom, a fault detect circuit means for sensing a short circuit between said nozzle assembly and said electrode and disabling said power source in response to a short detected thereby; and a disabling mechanism comprising:

a cable connected to said torch body, a main electrical conductor within said cable connected at one end to said electrode and at its other end to said power source;

sensing means within said cable detecting a puncture of the cable sufficient to contact said main conductor and in response to said contact actuating said fault detect circuit means to disable said power source;

said sensing means includes a continuous, electrically conductive shield embedded in said cable and circumscribing said main conductor and extending the length of said cable;

a drain lead in electrical contact with said shield and said nozzle assembly, said sensing means actuated when any electrically conductive object punctures said shield and contacts said main conductor to establish a short circuit between said electrode and said nozzle to actuate said fault detect circuit means;

said cable has a generally cylindrical outer jacket of an insulating, pliable plastic material; said shield comprises a metal foil embedded in said jacket; said drain lead comprises a bare wire extending the length of said cable and in contact with said foil; said main conductor contained in an insulated, plastic coating so that said outer jacket must be initially pierced and said coating must be subsequently punctured by an electrically conductive object extending therebetween before said sensing means is actuated.

39. A plasma arc torch system for effecting various processes on a metal workpiece comprising an electrical power source;

a gas supply source for generating a plasma;

a torch body including an electrode connected to said main power source and an insulated, electrically conductive nozzle assembly circumscribing said electrode;

fault detect circuit means for sensing a short circuit between said nozzle assembly and said electrode and disabling said power source in response thereto;

a pilot arc contact wire in electrical contact with said nozzle assembly, a pilot arc switch, a pilot arc lead connected to said fault detect circuit means and said pilot arc switch, a pilot arc lead connected to said fault detect circuit means and said pilot arc switch, a main power switch between said electrode and said power source, said fault detect circuit means actuated when said pilot arc switch and said main power switch are actuated to establish a pilot arc between said nozzle assembly and said electrode a predetermined voltage measure relative to said pilot arc lead is exceeded;

said nozzle assembly includes a generally cylindrical nozzle sleeve member within said torch body and a cup shaped tip member adapted to be threadingly secured to said nozzle body, as a pilot arc wire contact;

a continuity lead within said torch body, a continuous circuit source of electrical power connected to said continuity lead, said cup shaped tip member when properly fastened to said body establishing an electrical connection therethrough from said continuity lead to said drain lead and continuity circuit means measuring continuity between said continuity lead and said pilot arc wire contact so that in response to a lack of continuity therebetween said main power source is disabled whereby said torch is rendered safe at all times.

40. The plasma arc torch system of claim 39 wherein said nozzle sleeve member has an annular contact ring portion protruding from the torch body with an internally threaded central opening and a generally flat face surface, and a cylindrical base portion extending from the opposite side of said ring portion and fixedly secured within said torch body, said ring portion having an electrically insulated segment formed therein and a groove within said insulated segment, said continuity lead in the form of a continuity spring wire contact extending within said groove and protruding beyond said face of said base portion when said nozzle assembly is in an unassembled position, and said nozzle cup shaped tip member having an annular contact base surface and an externally threaded sleeve extending from said contact surface and adapted to be threadingly engaged with said internally threaded central opening of said nozzle sleeve member whereby said contact base surface seats against said flat face surface and moves said continuity spring wire contact within said groove when said cup shaped tip is properly secured to said nozzle body member, thereby establishing continuity for measurement by said continuity circuit means.

41. The plasma arc torch system of claim 40 further including rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the frequency and current of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses; and stabilizing means to sustain said plasma arc when said sensing means actuates said triggering means to reduce the phase angle of said pilot arc pulses.

42. The plasma arc torch system of claim 41 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means; and stabilizing means includes a capacitor in series with a diode for charging thereof and a resistor in parallel with said diode for discharging said capacitor, said capacitor of sufficient size to provide sufficient current to sustain said pilot arc for about 12 milliseconds.

43. A plasma arc torch system for effecting various processes on a metal workpiece comprising an electrical power source;

a gas supply source for generating a plasma;

a torch body including an electrode connected to said main power source and an insulated, electrically conductive nozzle assembly circumscribing said electrode;

fault detect circuit means for sensing a short circuit between said nozzle assembly and said electrode and disabling said power source in response thereto;

rectifying means to generate a series of d.c. electrical pulses applied to said electrode;

switch means to initiate a pilot arc between said nozzle and said electrode during start-up of said torch system which is transferred to said workpiece as a plasma arc during normal operation of said plasma arc torch system;

triggering means to vary the phase angle and current of said pulses from one value when said pilot arc is established to a second value when said plasma arc is established;

means to sense the current in each electrical pulse during the formation of a pilot arc and in response to a pulse exceeding a predetermined current value, at the moment said pilot arc is transferred to said plasma arc, to actuate said triggering means to reduce the phase angle of said pilot arc pulses.

44. The plasma arc torch system of claim 43 further including stabilizing means to sustain said plasma arc when said sensing means actuates said triggering means to reduce the phase angle of said pilot arc pulses.

45. The plasma arc torch system of claim 44 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

46. The plasma arc torch system of claim 45 wherein said stabilizing means includes a capacitor in series with a diode for charging thereof and a resistor in parallel with said diode for discharging said capacitor, said capacitor of sufficient size to provide sufficient current to sustain said pilot arc for about 12 milliseconds.

47. The plasma arc torch system of claim 46 wherein said triggering means to vary the phase angle retards the rectification of said electrical pulses in the phase angle plasma arc mode by about 25°.

48. The plasma arc torch system of claim 44 wherein said rectifier means which generate said electrical pulses includes a three-phase a.c. power supply, a transformer associated with each of said phases and a rectifying bridge circuit including controlled rectifiers, the input of said rectifying circuit being connected to the secondary circuit of said transformer and the output of said rectifying circuit providing direct operating voltage between said electrode and said workpiece;

said triggering means including means to control the degree of rectification of said rectifying circuit in response to actuation of said switch means.

* * * * *

UNITED STATES PATENT AND TRADEMARK OFFICE
CERTIFICATE OF CORRECTION

PATENT NO. : 4,929,811

DATED : May 29, 1990

INVENTOR(S) : George D. Blankenship

It is certified that error appears in the above-identified patent and that said Letters Patent is hereby corrected as shown below:

Title Page, Item [56], after "4,585,921 4/1986" delete "Wilking et al" and substitute --- Wilkins et al ---. Column 2, line 55, "possess" should read --- possesses ---. Col. 3, line 13 "activated," (second occurrence) should be deleted. Column 5, line 19, after "embedded" insert --- in ---; line 30, after "13" insert --- and ---; line 34, delete "and". Column 6, line 14, "maximum" should read --- minimum ---. Column 8, line 48, "31" should read --- 32 ---; line 65, "22" should read --- 32 ---. Claim 1, line 28, after "to" insert --- said ---. Claim 9, line 22, "increasing" should read --- decreasing ---; line 25 , "maximum" should read --- minimum ---. Claim 25, line 19, after "sensing" insert --- means ---. Claim 32, line 3, after the comma (,) insert --- a ---.

Signed and Sealed this

Seventh Day of July, 1992

*Attest:*

DOUGLAS B. COMER

*Attesting Officer*

*Acting Commissioner of Patents and Trademarks*